United States Patent
Sattler

(10) Patent No.: US 8,170,251 B2
(45) Date of Patent: May 1, 2012

(54) BATTERY COMPARTMENT COMPRISING SEVERAL GRIPPING ARMS AND HEARING EQUIPPED DEVICE THEREWITH

(75) Inventor: Michael Sattler, Erlangen (DE)

(73) Assignee: Siemens Medical Instruments PTE. Ltd., Singapore (SG)

( * ) Notice: Subject to any disclaimer, the term of this patent is extended or adjusted under 35 U.S.C. 154(b) by 939 days.

(21) Appl. No.: 12/221,665

(22) Filed: Aug. 5, 2008

(65) Prior Publication Data

US 2009/0041276 A1 Feb. 12, 2009

(30) Foreign Application Priority Data

Aug. 9, 2007 (DE) .......................... 10 2007 037 655

(51) Int. Cl.
*H04R 25/00* (2006.01)

(52) U.S. Cl. ...................................................... 381/323
(58) Field of Classification Search .................... 381/323
See application file for complete search history.

(56) References Cited

U.S. PATENT DOCUMENTS

| 4,783,816 | A | * | 11/1988 | Buttner et al. ................. 381/330 |
| 5,226,841 | A | | 7/1993 | Thörner |
| 5,265,275 | A | | 11/1993 | Goldenberg et al. |
| 5,445,900 | A | * | 8/1995 | Miller et al. ........................ 429/1 |
| 7,123,733 | B1 | | 10/2006 | Borowsky et al. |
| 2005/0221167 | A1 | | 10/2005 | Fushimi et al. |
| 2007/0141449 | A1 | * | 6/2007 | Kim ................................ 429/66 |

FOREIGN PATENT DOCUMENTS

| DE | 199 03 090 A1 | 8/2000 |
| JP | 2000164188 A1 | 6/2000 |

* cited by examiner

*Primary Examiner* — Steven Loke
*Assistant Examiner* — Kimberly M Thomas

(57) ABSTRACT

A battery compartment for a hearing apparatus and in particular for a hearing device is to be designed to be more compact. To this end, provision is made for a battery compartment with at least two gripping arms, which has an arm section on its one end and a gripping section on its other free end in each instance and for a sliding element which engages with the arm section of the gripping arms. In a first sliding position of the sliding element, the gripping arms assume an open position in order to insert a battery between the gripping sections and a closed position in a second sliding position in order to fix the battery, in which closed position the gripping sections are moved toward one another.

19 Claims, 2 Drawing Sheets

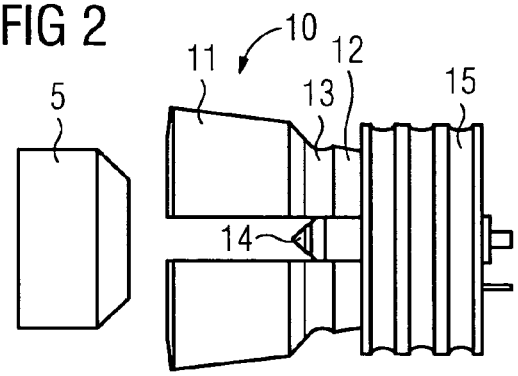
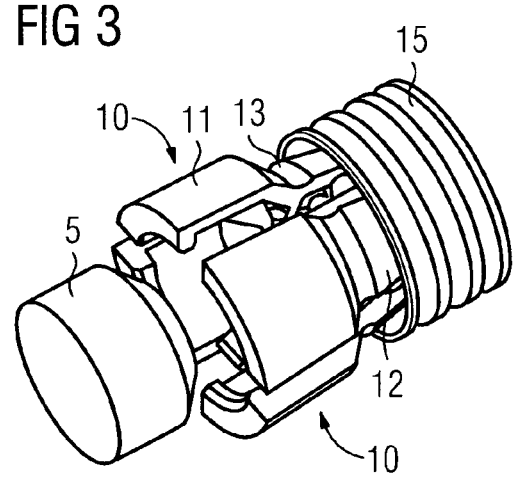
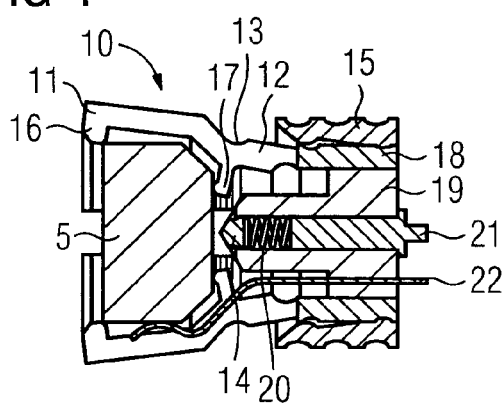
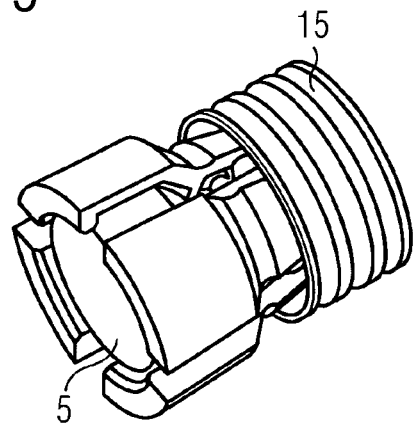
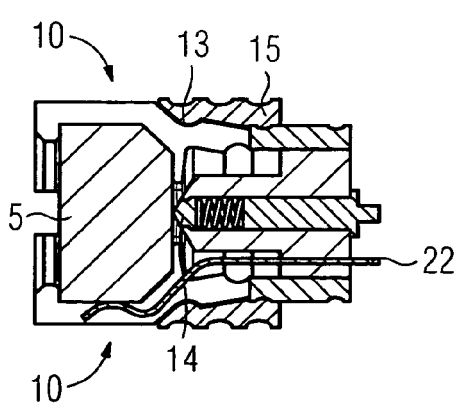
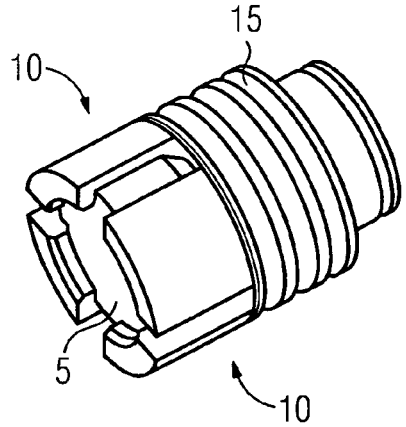

BATTERY COMPARTMENT COMPRISING SEVERAL GRIPPING ARMS AND HEARING EQUIPPED DEVICE THEREWITH

CROSS REFERENCE TO RELATED APPLICATIONS

This application claims priority of German application No. 10 2007 037 655.5 DE filed Aug. 9, 2007, which is incorporated by reference herein in its entirety.

FIELD OF INVENTION

The present invention relates to a battery compartment for a hearing apparatus. In particular, the present invention relates to a hearing device with a battery compartment of this type. The term hearing apparatus is understood here to mean, in addition to a hearing device, also another sound-emitting device which can be worn on the ear, like for instance a headset, earphones and suchlike.

BACKGROUND OF INVENTION

Hearing devices are wearable hearing apparatuses which are used to assist the hard-of-hearing. In order to accommodate numerous individual requirements, various types of hearing devices are available such as behind-the-ear (BTE) hearing devices, hearing device with an external receiver (RIC: receiver in the canal) and in-the-ear (ITE) hearing devices, for example also concha hearing devices or completely-in-the-canal (ITE, CIC) hearing devices. The hearing devices listed as examples are worn on the outer ear or in the auditory canal. Bone conduction hearing aids, implantable or vibrotactile hearing aids are also available on the market. The damaged hearing is thus stimulated either mechanically or electrically.

The key components of hearing devices are principally an input converter, an amplifier and an output converter. The input converter is normally a receiving transducer e.g. a microphone and/or an electromagnetic receiver, e.g. an induction coil. The output converter is most frequently realized as an electroacoustic converter e.g. a miniature loudspeaker, or as an electromechanical converter e.g. a bone conduction hearing aid. The amplifier is usually integrated into a signal processing unit. This basic configuration is illustrated in FIG. 1 using the example of a behind-the-ear hearing device. One or a plurality of microphones 2 for recording ambient sound are built into a hearing device housing 1 to be worn behind the ear. A signal processing unit 3 which is also integrated into the hearing device housing 1 processes and amplifies the microphone signals. The output signal for the signal processing unit 3 is transmitted to a loudspeaker or receiver 4, which outputs an acoustic signal. Sound is transmitted through a sound tube, which is affixed in the auditory canal by means of an otoplastic, to the device wearer's eardrum. Power for the hearing device and in particular for the signal processing unit 3 is supplied by means of a battery 5 which is also integrated in the hearing device housing 1.

For hearing devices, round coin cells are generally used to supply power. These batteries must be accommodated in the housing of the hearing device in an exchangeable fashion. To this end, the housings of hearing devices are provided with battery compartments, into which the batteries are inserted. One of the most common structures of battery compartments of this type consists in a swivel-mounted compartment. The compartment itself is adjusted to the battery shape and can be swiveled out of the hearing device housing about a pivotal point and/or a hinge. When the battery compartment is in the swiveled-out state, the battery is freely accessible. Such battery compartments are disadvantageous as a result of the relatively large space requirements, particularly for the swiveling mechanism.

The publication DE 199 03 090 A1 discloses a water-tight hearing treatment device, in which the battery compartment is sealed in a water-tight fashion in respect of the remaining housing. The battery compartment is screwed to the remaining housing.

SUMMARY OF INVENTION

An object of the present invention is to accommodate a battery in a hearing apparatus and therewith requiring a small installation space.

In accordance with the invention, this object is achieved by a battery compartment for a hearing apparatus including at least two gripping arms, which comprise an arm section on its one end and a gripping section on its other free end in each instance and a sliding element, which engages with the arm sections of the gripping arms, so that an open position is assumed in a first sliding position of the sliding element in order to insert a battery between the gripping sections and a closed position is assumed in a second sliding position in order to fix the battery, in which closed position the gripping sections are moved on top of each other.

It is advantageously possible with the inventive construction to dispense with a swiveling mechanism of the battery compartment, which requires a relatively large amount of space.

The battery compartment preferably has a round cross-section and three or four gripping arms are arranged annularly. The battery compartment thus resembles tongs, into which a battery can be quickly inserted and fixedly fastened. The number of gripping arms can optionally also be two, five or more.

The sliding element of the battery compartment can be a ring, which can be moved along the arm sections of the gripping arms and engage into the gripping arms in the second sliding position. The ring allows gripping arms to be equally pressed together and/or opened with one simple operation.

According to a preferred embodiment, the gripping arms are manufactured from plastic. When suitably selecting the plastic, the gripping arms then have the necessary spring property, so that no further spring elements are to be provided.

According to an alternative embodiment, the gripping arms can be manufactured from metal with an insulating casing. The insulation is necessary if the gripping arms come into contact with several poles of the battery.

Each gripping arm can also have an F-shaped cross-section and/or an F-shaped profile, so that the battery to be accommodated in the battery compartment can be fixed between the parallel legs of the cross-section. The leg in the center region of the cross-section then has the object of drawing these somewhat nearer to one another when pressing the battery into the gripping arms so that the sliding element can be moved more easily into its second sliding position.

A contact spring can also be arranged between the at least two gripping arms, in order for a coin cell to make contact with its cover. The space between two gripping arms can thus be used for the battery contacting. It is then also not necessary to use the gripping arms simultaneously for contacting purposes, so that a material which is optimized solely for this function can be used for the gripping arms.

According to a further embodiment, a spring contact is arranged centrally between the arms sections of the gripping arms in order to make contact with the coin battery to be inserted at one of its front faces. This second contact can also be easily optimized, particularly in respect of its contacting function.

Provision is particularly preferably made for a hearing device with a signal processing facility and an above-described battery compartment, into which a battery can be inserted for supplying power to the signal processing facility. In the case of a behind-the-ear hearing device, it may thus be possible to profit from the space saving as a result of the battery compartment with the gripping arms.

BRIEF DESCRIPTION OF THE DRAWINGS

The present invention is exemplarily described in more detail with reference to the appended drawings, in which:

FIG. 2 shows a side view of a battery compartment in the open position;

FIG. 3 shows a perspective representation of the battery compartment in FIG. 2;

FIG. 4 shows a cross-section through the battery compartment in FIG. 2 with an inserted battery;

FIG. 5 shows a perspective representation of the battery compartment in FIG. 4;

FIG. 6 shows the battery compartment in FIG. 4 in the closed state and

FIG. 7 shows a perspective representation of the battery compartment in FIG. 6.

DETAILED DESCRIPTION OF INVENTION

Figure 1:
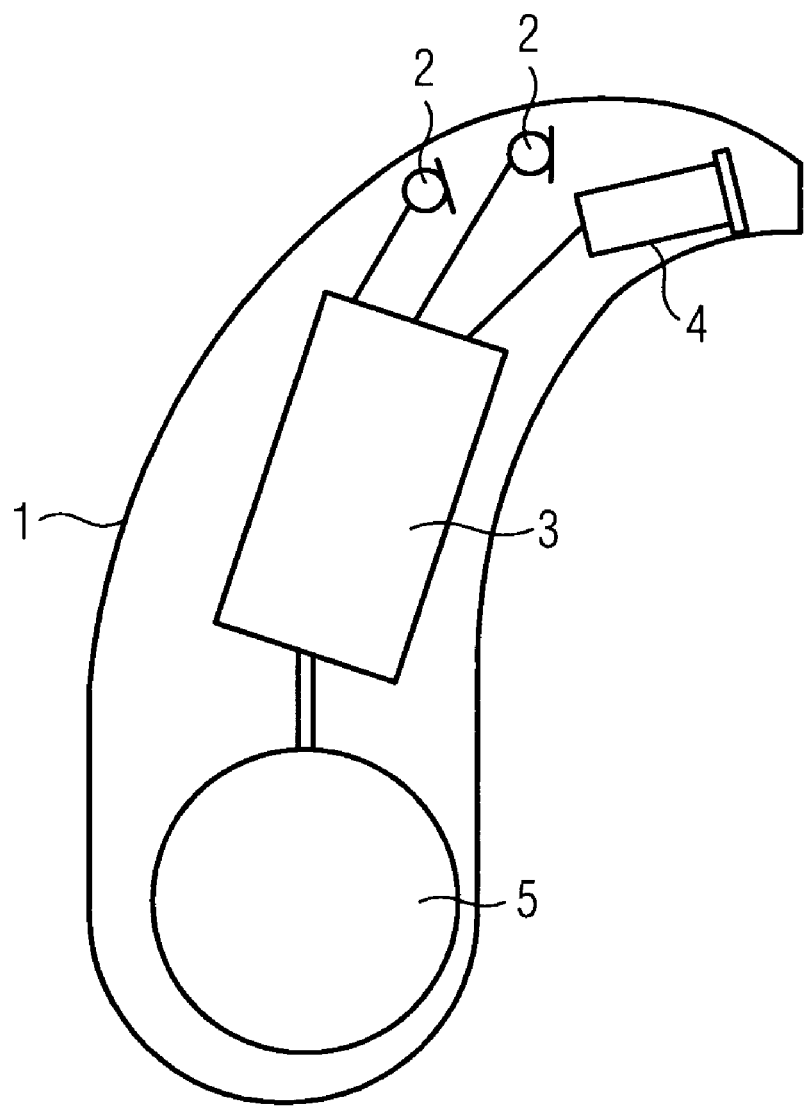
FIG. 1 shows a representation of the basic design of a hearing device according to the prior art.

The exemplary embodiment illustrated in more detail below represents a preferred embodiment of the present invention.

The side view in FIG. 2 shows a battery compartment, which is constructed according to the principle of tongs. It has several gripping arms 10, which are located in a spread-apart position, i.e. an open position. Each gripping arm consists of a gripping section 11 and an arm section 12. A groove 13 is located between these two sections In the open position, the battery compartment is able to accommodate a battery 5, here a coin cell. In the inserted state, this battery is contacted by a spring contact 14 on its front side. A sliding element, here a sliding ring 15, surrounds the cylindrically arranged arm sections 12 of the individual gripping arms 10. The sliding ring 15 is positioned here in a first sliding position, in which the gripping arms 10 are not pressed together by the sliding ring 15 and the battery 5 can be inserted into the gripping arm sections 11.

The three-dimensional representation in FIG. 3 illustrates the battery compartment in FIG. 2. Four gripping arms 10 are equally distributed on the periphery of the cylindrical battery compartment. The gripping arms 10 can be moved independently of one another.

It is also apparent that the gripping arms 10 form a cavity with their gripping sections 11 in the open position, into which cavity the battery 5 can be inserted.

FIG. 4 shows an axial cutout through the cylindrical battery compartment in the state in which the battery 5 is already inserted into the cavity between the individual gripping arms 10. Each gripping arm has an F-shaped profile and extends at right angles thereto about a quarter of a revolution. The two parallel legs 16 and 17 of the F-shaped profile are used to fix the battery to its two front faces in respect of the axial movement.

If during insertion the battery 5 is pressed against the inner leg 17, i.e. the leg of the F-shaped profile, which is closer to the arm section 12, the respective gripping arm 10 pivots approximately toward the battery 5, so that the outer leg 16 engages behind the battery 5. The angle between the individual gripping arms 10, which are spread apart from each other in the open position, thus reduces. To allow for this gripping movement of the gripping arms 10, these are mounted on their arm sections 12 in either a spring-elastic or rotatable fashion.

The gripping arms 10 are expediently injection molded together in one piece, with the gripping arms 10 protruding from a cylindrical section 18. The distances between the individual gripping arms 10 allow them to be moved toward one another in the radial direction.

Furthermore, FIG. 4 shows an axial section of the spring contact 14. It is mounted in an axially movable fashion in a round insulating part 19 within the tubular section 18. A spring 20 pushes it in the direction of the battery 5. The spring 20 rests against a contact pin 21, which extends in the axial direction and protrudes from the battery compartment.

A spring contact 22, which on the side of the battery compartment facing the battery 5 likewise protrudes herefrom, is fixed in the round insulating part 19. On the side facing the battery 5, it runs between two gripping arms 10 approximately along the profile of the gripping arms. It is used to make contact between the battery 5 and its cover surface.

FIG. 5 shows the battery compartment in FIG. 4 equipped with the battery 5, however in the three-dimensional perspective. The battery compartment is still not completely closed because the sliding ring 15 is still positioned in its first sliding position, in which it does not or not significantly push the gripping arms 10 together.

FIG. 6 now shows an axial section through the inventive battery compartment in its closed position. The gripping arms 10 encompass the battery 5, which is realized here as a coin cell, on its shell and partially on its front faces. It is thus fixed axially and radially. The gripping arms 10 are held in the radial direction by means of the sliding ring 15. It is located here in the second sliding position and is engaged in the groove 13. The sliding ring 15 was thus moved in the axial direction from the first position to the second position, as a result of which the gripping arms are moved even further toward one another and finally assume the closed position. In this closed position, the battery 5 can no longer be removed from the battery compartment. The center contact 14 and the cover contact and/or the contact spring 22 contact the battery 5 and convey their potential to the side of the battery compartment facing the battery 5.

FIG. 7 finally also shows a three-dimensional view of the battery compartment in the position in FIG. 6. The battery 5 is fixed by means of the gripping arms 10 and the sliding ring 5 is located engaged in the second sliding ring. The battery compartment, which can be embodied as an integrated part of the hearing device housing, is expanded when the battery is exchanged. For the operation, the battery compartment is locked, with the battery being encompassed in a form-fit fashion. This realization of a battery compartment advantageously results in an optimum space utilization, in particular with a round hearing device design, since the diameter of the hearing device housing is only determined by the diameter of the battery plus the required or desired wall thicknesses of the housing material.

The invention claimed is:

1. A battery compartment for a hearing apparatus, comprising:
   at least two gripping arms, which comprise an arm section on its one end and a gripping section on its other free end in each instance; and
   a sliding element, which engages with the arm sections of the gripping arms such that in a first sliding position of the sliding element the gripping arms assume an open position in order to insert a battery between the gripping sections and assume a closed position in a second sliding position for fixing the battery, in which closed position the gripping sections are moved toward one another,
   wherein a spring contact is arranged centrally between the arm sections of the gripping arms in order to make contact with a front face of the battery.

2. The battery compartment as claimed in claim 1, further comprising a round cross-section and three or four gripping arms arranged in a circuit and distributed equally on the periphery.

3. The battery compartment as claimed in claim 1, wherein the sliding element is a ring, which can be displaced along the arm sections of the gripping arms and engage in the gripping arms in the second sliding position.

4. The battery compartment as claimed in claim 2, wherein the sliding element is a ring, which can be displaced along the arm sections of the gripping arms and engage in the gripping arms in the second sliding position.

5. The battery compartment as claimed in claim 1, wherein the gripping arms are manufactured from plastic.

6. The battery compartment as claimed in claim 2, wherein the gripping arms are manufactured from plastic.

7. The battery compartment as claimed in claim 3, wherein the gripping arms are manufactured from plastic.

8. The battery compartment as claimed in claim 1, wherein the gripping arms are manufactured from metal with an insulating casing.

9. The battery compartment as claimed in claim 2, wherein the gripping arms are manufactured from metal with an insulating casing.

10. The battery compartment as claimed in claim 3, wherein the gripping arms are manufactured from metal with an insulating casing.

11. The battery compartment as claimed in claim 1, wherein each gripping arm has an F-shape cross-section, such that the battery to be accommodated in the battery compartment can be fixed between parallel legs of the cross-section.

12. The battery compartment as claimed in claim 2, wherein each gripping arm has an F-shape cross-section, such that the battery to be accommodated in the battery compartment can be fixed between parallel legs of the cross-section.

13. The battery compartment as claimed in claim 3, wherein each gripping arm has an F-shape cross-section, such that the battery to be accommodated in the battery compartment can be fixed between the parallel legs of the cross-section.

14. The battery compartment as claimed in claim 1, wherein a contact spring is arranged between the at least two gripping arms in order to make contact with a shell of the battery.

15. The battery compartment as claimed in claim 2, wherein a contact spring is arranged between the at least two gripping arms in order to make contact with a shell of the battery.

16. The battery compartment as claimed in claim 3, wherein a contact spring is arranged between the at least two gripping arms in order to make contact with a shell of the battery.

17. The battery compartment as claimed in claim 8, wherein a contact spring is arranged between the at least two gripping arms in order to make contact with a shell of the battery.

18. The battery compartment as claimed in claim 11, wherein a contact spring is arranged between the at least two gripping arms in order to make contact with a shell of the battery.

19. A hearing device, comprising:
   a signal processing unit; and
   a battery compartment to insert a battery for supplying power to the signal processing unit, wherein the battery compartment has
      at least two gripping arms, which comprise an arm section on its one end and a gripping section on its other free end in each instance; and
   a sliding element, which engages with the arm sections of the gripping arms such that in a first sliding position of the sliding element the gripping arms assume an open position in order to insert the battery between the gripping sections and assume a closed position in a second sliding position for fixing the battery, in which closed position the gripping sections are moved toward one another,
   wherein a spring contact is arranged centrally between the arm sections of the gripping arms in order to make contact with a front face of the battery.

* * * * *